US005855776A

United States Patent [19]

Bowe et al.

[11] Patent Number: 5,855,776

[45] Date of Patent: Jan. 5, 1999

[54] PRECIPITATION APPARATUS AND METHOD

[75] Inventors: Michael Joseph Bowe, Preston; John William Stairmand, Blackpool, both of United Kingdom

[73] Assignee: AEA Technology plc, Didcot, United Kingdom

[21] Appl. No.: 484,901

[22] Filed: Jun. 7, 1995

Related U.S. Application Data

[63] Continuation of Ser. No. 189,449, Jan. 31, 1994, abandoned, which is a continuation of Ser. No. 994,422, Dec. 16, 1992, abandoned, which is a continuation of Ser. No. 671,021, Mar. 18, 1991, abandoned.

[30] Foreign Application Priority Data

Mar. 29, 1990 [GB] United Kingdom .................. 9007027

[51] Int. Cl.[6] ............................ B01D 21/00; B01D 21/28

[52] U.S. Cl. ....................... 210/205; 210/195.1; 366/136; 366/338

[58] Field of Search .................................... 210/194, 205, 210/512.1, 702, 704, 712, 738, 787, 806, 195.1; 366/136, 137, 150.1, 152.1, 159.1, 160.1, 165.1, 167.1, 172.1, 173.1, 177.1, 179.1, 182.1

[56] References Cited

U.S. PATENT DOCUMENTS 4,666,669 5/1987 Mumaw ............................... 366/172.1

*Primary Examiner*—Terrence Till

*Attorney, Agent, or Firm*—D. Peter Hochberg; William R. Hinds; William H. Holt

[57] ABSTRACT

Apparatus for the on-line treatment of chemical reagents, including a flow line for a reagent flow, a vortex mixer in the flow line for combining and mixing the reagent flow with at least one further reagent flow, a pulser in the flow line for causing the pulsing of the mixed flow from the vortex mixer, and a vessel having an array of vortex cells for receiving the pulsing mixed flow to cause development and growth of precipitate under narrow residence time distribution conditions. Flow lines mix a flow of reagents to initiate precipitation. The pulser pulses the admixed reagents and causes the pulsing mixed flow to swirl with a constantly reversing rotational flow to achieve development and growth of precipitate.

7 Claims, 1 Drawing Sheet

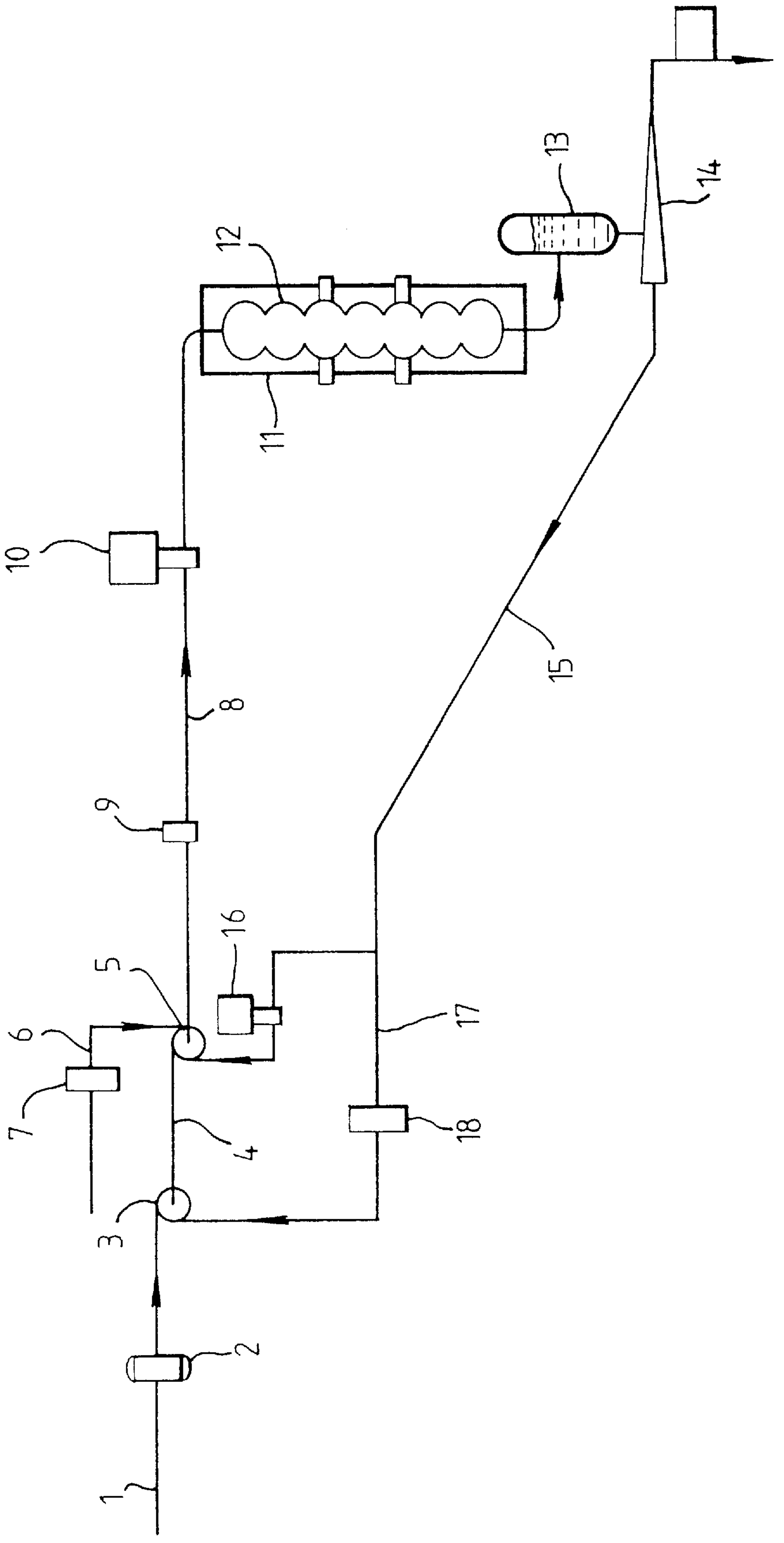
1
2
3
4
5
6
7
8
9
10
11
12
13
14
15
16
17
18

PRECIPITATION APPARATUS AND METHOD

This application is a continuation of application Ser. No. 08/189,449, filed Jan. 31, 1994, now abandoned, which was continuation of Ser. No. 07/994,422 filed Dec. 16, 1992 now abandoned, which was a continuation of application Ser. No. 07/671,021 filed Mar. 18, 1991, now abandoned.

The present invention concerns apparatus and method for the on-line treatment of chemical reagents. In particular the invention concerns apparatus and method for mixing reagents to cause precipitation of particles with narrow size distribution with the facility for on-line changes in mixing intensity, to change particle mean size and size distribution.

FEATURES AND ASPECTS OF THE INVENTION

According to the present invention, an apparatus for carrying out on-line a chemical process comprises mixing means for mixing a plurality of chemical reagents, at least one of the reagents being a fluid, pulser means for superimposing cyclic flow pulsations upon outflow of mixed reagents from said mixing means, and a reaction chamber adapted to receive the pulsed flow of the mixed reagents, the reaction chamber comprising a series of communicating vortex cells configured to set up, in conjunction with the pulsed flow of the mixed reagents, a swirling flow in the vortex cells of the reaction chamber.

DESCRIPTION OF THE DRAWING

An embodiment of the invention is described, by way of example, with reference to the accompanying schematic diagram of an apparatus for on-line precipitation.

DESCRIPTION OF THE PREFERRED EMBODIMENT

Reagents are pumped along a flow line 1 by, for example, a gear pump 2 to enter a first vortex mixer 3. The vortex mixer comprises a cylindrical vortex chamber having at least one tangential inlet port in the circumferential wall of the chamber and an axial outlet port in an end wall of the chamber. Flow enters tangentially to swirl through the chamber to emerge at the outlet and in so doing thorough mixing of the reagents in the flow takes place.

The flow from the vortex mixer 3 proceeds along conduit 4 to enter a second vortex mixer 5 at a tangential inlet port. A second reagent flow, which can be liquid or gas, along a conduit 6 and likewise pumped by, for example, a gear pump 7 enters the second vortex mixer 5 through a further tangential inlet port. The two flows from the conduits 4 and 6 swirl through the second vortex mixer 5 and in so doing are thoroughly mixed together such that the mixing time is less than or equal to the incubation period for the particle precipitation reaction.

A rapid and thorough mixing is necessary when the reagents react to form a precipitate within a very short time interval. It is therefore desirable to complete the mixing in a time not longer than the incubation time for precipitation so that nucleation occurs under conditions of uniform supersaturation.

The flow along the conduit 8 from the second vortex mixer 5 will comprise the admixed reagents with a precipitate resulting from the interaction of the reagents. A pH meter 9 can be included in the conduit 8. A pulser 10, which can be a mechanical or fluidic device, is also included in the conduit 8 so as to cause a pulsing or oscillating flow to emerge from the conduit 8 into a vessel 11 in which the precipitate is allowed to develop to a final state under narrow residence time distribution conditions. The pulsing flow serves to mix the fluid, minimize deposition of precipitate on the walls of the conduits and vessel 11 and also serves to re-disperse boundary layer fluids back into the bulk fluid. The vessel 11 can comprise a plurality of substantially circular radiused sections 12 forming an array of vortex cells connected together and connected back-to-back. The mean residence time of the flow in the vessel can be altered by changing the number of sections 12 as required. The distribution of residence time about the mean value and the degree of agitation in the vessel can be varied by variation of pulse amplitude and/or frequency and also the number of sections 12. The pulsing flow passes gradually through the vessel 11 and the configuration of the sections 12 is such as to cause the flow to swirl through the sections forming the array of vortex cells with constantly reversing rotational direction.

The flow from the vessel 11 passes into a pulse dampener 13 which is basically a vessel having an enclosed gas volume acting as a buffer to dampen oscillations or pulses in the flow. From there the flow enters a centrifugal separator such as a low shear hydrocyclone 14 for segregation of ripened particle size.

Overflow from the hydrocyclone 14 substantially depleted in larger particles can be recycled along conduit 15 by means of a low shear mono pump or the like 16, the recycled flow being introduced tangentially into the vortex mixer 5 to serve as a seed stream to minimize homogenous nucleation. An extension 17 of the conduit 15, having a gear pump 18, conveys a part of the hydrocyclone overflow stream to a second tangential port at the first vortex mixer 3. This permits mixing with the incoming stream along the conduit 1. Ideally the particles in the recycle stream will re-dissolve and indeed in many hydrolysis reactions flow and pH can be adjusted so this will happen. The resulting single phase fluid can then be fed to the mixer valve 5 to provide the means for varying mixing intensity without providing seed particles to the system. By varying the recycle rate in the extension 17 it is possible to vary the mixing intensity in the mixer valve on line and without adjusting the main feed flow rates. It is thereby possible to obtain on-line adjustment of particle size distribution, because variation in mixing intensity effects the range of supersaturation values present in the mixing volume at the onset of nucleation. This effects both the rate of generation of nuclei and the subsequent growth rate.

The recycled flow is then employed in 2 ways:

1. It can be employed in mixer valve 5 to act as a precipitate seed stream.
2. It can be mixed with incoming feed and the recycled particles dissolved in mixer 3. The single phase fluid can then be used to vary mixing intensity in mixer valve 5.

This allows seeding conditions and mixing intensity to be decoupled. The system as a whole can now provide 3 degrees of freedom.

1. Variation of mixing intensity to adjust initial nucleation and growth rate.
2. Variation of seed stream flowrate to control initial nucleation rate and particle morphology.
3. Variation in precipitate development or ripening conditions by variation in mixing intensity and by variation in residence time distribution (in vessel 11) to control final particle size and distribution.

I claim:

1. An apparatus for carrying out on-line a chemical process, said apparatus comprising mixing means for mixing a plurality of chemical reagents, at least one of said reagents being a fluid, pulser means for superimposing cyclic flow pulsations upon outflow of mixed reagents from said mixing means, and a reaction chamber adapted to receive the pulsed flow of the mixed reagents, the reaction chamber comprising a series of communicating vortex cells configured to set up, in conjunction with said pulsed flow of the mixed reagents, a swirling flow in the vortex cells of the reaction chamber.

2. An apparatus according to claim 1 wherein the vortex cells are spherical in form.

3. An apparatus according to claim 1 for the on-line chemical process, wherein the pulsations in the flow of the mixed reagents are adapted to cause the development and growth of precipitate within the reaction chamber under narrow residence time conditions within the vortex cells of the reaction chamber.

4. Apparatus according to claim 3 including a separator adapted to receive flow from the reaction chamber.

5. Apparatus according to claim 4 including a flow pulse damper situated between the reaction chamber and the separator.

6. Apparatus according to claim 4 including a return flow conduit for recycling a part of the outflow from the separator to the reagent mixing means.

7. Apparatus according to claim 1 wherein the reagent mixing means comprises a vortex mixer.

* * * * *